(12) United States Patent
Goldentouch

(10) Patent No.: US 10,397,540 B2
(45) Date of Patent: Aug. 27, 2019

(54) METHOD FOR OBTAINING AND MERGING MULTI-RESOLUTION DATA

(71) Applicant: INUITIVE LTD., Ra'anana (IL)

(72) Inventor: Lev Goldentouch, Rishon Lezion (IL)

(73) Assignee: INUITIVE LTD., Ra'anana (IL)

( * ) Notice: Subject to any disclaimer, the term of this patent is extended or adjusted under 35 U.S.C. 154(b) by 92 days.

(21) Appl. No.: 15/534,204

(22) PCT Filed: Dec. 6, 2015

(86) PCT No.: PCT/IL2015/000050
§ 371 (c)(1),
(2) Date: Jun. 8, 2017

(87) PCT Pub. No.: WO2016/092533
PCT Pub. Date: Jun. 16, 2016

(65) Prior Publication Data
US 2017/0366796 A1    Dec. 21, 2017

Related U.S. Application Data

(60) Provisional application No. 62/089,287, filed on Dec. 9, 2014.

(51) Int. Cl.
*H04N 13/128* (2018.01)
*G06T 15/20* (2011.01)
(Continued)

(52) U.S. Cl.
CPC ............. *H04N 13/128* (2018.05); *G06T 7/97* (2017.01); *G06T 15/205* (2013.01);
(Continued)

(58) Field of Classification Search
USPC ................................................. 348/46, 47, 48
See application file for complete search history.

(56) References Cited

U.S. PATENT DOCUMENTS 5,220,441 A * 6/1993 Gerstenberger ...... G06F 17/153
348/135
6,985,162 B1    1/2006 Schinnerer et al.
(Continued)

FOREIGN PATENT DOCUMENTS

WO    2013109252 A1    7/2013
WO    2014154839 A1    10/2014
WO    WO-2014154839 A1 * 10/2014 ........... H04N 13/366

*Primary Examiner* — Alexander Gee
(74) *Attorney, Agent, or Firm* — Browdy and Neimark, PLLC

(57) ABSTRACT

A method and a device are provided for generating an image. The method comprises the steps of: (i) providing information that relates to an image of a single target captured by at least two image capturing devices; (ii) storing the information provided in at least two input buffers; (iii) sampling the stored information and storing the sampled information at at least two output line buffers, each corresponding to a different image resolution; (iv) processing the sampled information that had been stored at the at least two output line buffers in accordance with pre-defined disparity related information, wherein the pre-defined disparity related information is associated with a respective one of the at least two image capturing devices that had captured the information being currently processed; and (v) retrieving information from the at least two output line buffers and storing the retrieved information at a hybrid row buffer, for generating the image.

18 Claims, 11 Drawing Sheets

(51) Int. Cl.
*H04N 13/239* (2018.01)
*G06T 7/00* (2017.01)
*H04N 13/00* (2018.01)

(52) U.S. Cl.
CPC . *H04N 13/239* (2018.05); *G06T 2207/10012* (2013.01); *H04N 2013/0081* (2013.01)

(56) References Cited

U.S. PATENT DOCUMENTS

| | | | |
|---|---|---|---|
| 2004/0046773 A1* | 3/2004 | Inoue | G06T 3/4007 345/698 |
| 2005/0100207 A1 | 5/2005 | Konolige | |
| 2006/0238604 A1* | 10/2006 | Shin | B41J 2/473 347/225 |
| 2008/0122872 A1* | 5/2008 | Hsu | G06T 3/4023 345/667 |
| 2008/0309666 A1 | 12/2008 | Chen et al. | |
| 2009/0315976 A1 | 12/2009 | Jeong et al. | |
| 2010/0259775 A1* | 10/2010 | Sakamoto | H04N 1/58 358/1.9 |
| 2011/0169818 A1* | 7/2011 | Pan | H04N 13/128 345/419 |
| 2011/0298898 A1 | 12/2011 | Jung et al. | |
| 2014/0139643 A1* | 5/2014 | Hogasten | H01L 27/14609 348/48 |
| 2014/0198977 A1 | 7/2014 | Narasimha et al. | |
| 2014/0267243 A1* | 9/2014 | Venkataraman | G06T 7/557 345/419 |
| 2015/0049169 A1* | 2/2015 | Krig | H04N 13/211 348/46 |
| 2015/0116459 A1* | 4/2015 | Liu | H04N 13/296 348/46 |

* cited by examiner

METHOD FOR OBTAINING AND MERGING MULTI-RESOLUTION DATA

TECHNICAL FIELD

The present disclosure generally relates to methods for using optical devices, and more particularly, to methods that enable stereoscopic reconstruction of three dimensional images.

BACKGROUND

A stereoscopic camera arrangement is an element made of two camera units, assembled in a stereoscopic module. Stereoscopy (also referred to as "stereoscopics" or "3D imaging") is a technique for creating or enhancing the illusion of depth in an image by means of stereopsis. In other words, it is the impression of depth that is perceived when a scene is viewed with both eyes by someone with normal binocular vision which is responsible for creating two slightly different images of the scene in the two eyes due to the eyes'/camera's different locations.

Combining 3D information derived from stereoscopic images, and particularly for video streams, requires search and comparison of a large number of pixels to be held for each pair of images where each derived from a different image capturing device.

Stereo matching algorithms are used to solve the compatibility in stereo images by using feature-, phase-, or area-based matching to calculate disparities in the images. Feature-based matching searches are used for searching characteristics in the images, like edges or curves, which in turn are used for calculating the best matches according to the similarities found. Phase-based algorithms band pass filter the images and extract their phase. Area-based algorithms operate on blocks of pixels from both images and calculate their level of matching. This can be done in parallel for all analyzed pixels. When using a constant block size over the whole image, called box filtering, these algorithms are especially amenable to parallel and hardware-based solutions.

Color information can be used to improve the matching performance significantly. However, the required hardware resources for processing color images on embedded real-time systems are still very high.

When determining depth from stereoscopic sources, using different resolutions leads to achieving different results. By analyzing an image, while using a plurality of resolutions and merging the results of these different resolutions, the outcome thus obtained is notably better than a result obtained while using a single resolution. However, when such a solution is implemented by using an FPGA/ASIC, the local storage and access to external memory need to be optimized. In this setup, several resolutions may be analyzed line by line in parallel pipelines with different parameters, and the analysis results are merged using several merging setups.

Currently, the typical solution applied in the art to obtain an image derived from merging the results obtained while using different resolutions, is, to retrieve the analysis results for each of the different resolutions used, in a separate system run, and then to merge the results thus obtained in yet an additional system run. Consequently, the prior art solution requires either using large internal buffers or requires multiple full-frame accesses to an external memory.

SUMMARY OF THE DISCLOSURE

The disclosure may be summarized by referring to the appended claims.

It is an object of the present disclosure to provide a method for generating a stereoscopic image based on analyzing images retrieved from a number of image capturing devices, at different resolutions.

It is another object of the present disclosure to provide a method for generating a stereoscopic image by using a 1-line internal buffer (a hybrid row buffer) configured to store and retrieve data associated with the image being generated, at a plurality of resolution levels.

It is another object of the present disclosure to provide a method for generating a stereoscopic image by using a buffer configured to store and retrieve data of part of a line associated with the image being generated, at a plurality of resolution levels.

Other objects of the present invention will become apparent from the following description.

According to a first embodiment of the disclosure, there is provided a method for generating a 3-D image. The method comprises the steps of:

(i) providing information that relates to an image of a single target that was captured by at least two image capturing devices;

(ii) storing information provided in at least two input buffers;

(iii) retrieving the information stored in the at least two input buffers;

(iv) sampling the retrieved information and storing the sampled information at at least two output line buffers, each corresponding to a different image resolution;

(v) processing the sampled information that had been stored at the at least two output line buffers in accordance with pre-defined disparity related information, wherein the pre-defined disparity related information is associated with a respective one of the at least two image capturing devices that had captured the information being currently processed; and (vi) retrieving information from the at least two output line buffers and storing the retrieved information at a hybrid row buffer, for generating that image.

As will be appreciated by those skilled in the art, step (i) may be preceded by a step of capturing an image of a single target by at least two image capturing devices (e.g. at least two cameras).

The term "line buffer" as used herein throughout the specification and claims is used to denote a buffer for storing data derived from one or more lines of the captured image. For example, for down-sampling in the vertical direction, the content of several lines is stored. Also, the line buffer may be used to store part of one or more lines, for example, when the region of interest ("ROI") part of the one or more lines is being processed directly (without storing it at the line buffer) while the down-sampling data requires a small (i.e. smaller than a line) buffer capacity.

According to another embodiment, the method further comprising repeating steps (i) to (vi) in a process of generating that image.

In accordance with another embodiment, step (iv) comprises filtering the information retrieved, sampling the filtered information and storing the sampled information at the at least two output line buffers.

By yet another embodiment, the retrieved information from the at least two output line buffers is processed in accordance with the following steps:

a. processing the information retrieved to obtain data that relates to disparity and depth from images captured by the at least two image capturing devices;

b. storing data associated with a single resolution level at a separate register of the hybrid row buffer;

c. detecting current resolution in a hybrid line pixel based on pixel location index in the hybrid line;

d. generating a predefined value on stitches (e.g. borders) between various resolutions in the hybrid line; and e. generating results on a per-pixel basis to obtain a sub-pixel accuracy.

According to still another embodiment, the method further comprising a step of merging obtained data in order to generate an image, wherein this step includes:

a) processing data derived from the captured image processed at a plurality of different resolution levels;

b) merging the processed data derived from the captured image at the plurality of different resolution levels;

c) associating each pixel belonging to the image being generated, with a single output value that corresponds to the original resolution level.

In addition, step c) may further comprise: for each pixel, determining a confidence level that corresponds to the original resolution level.

In accordance with another embodiment, the hybrid row buffer comprises data associated with at least one up sampled region and data associated with at least one down sampled region.

By still another embodiment, the data associated with at least one down sampled region has equal or larger dynamic range and spatial coverage than data that is associated with at least one up sampled region.

According to yet another embodiment, the data associated with at least one down sampled region is adapted for a better noise resilience, while data that is associated with at least one up sampled region is adapted for a better sub-pixel accuracy and spatial resolution.

In accordance with another embodiment, at least one of the at least two output line buffers is configured to store one or more parts of a line of the image. For example, a line part, being a Region of Interest ("ROI"), may be forwarded directly for core processing, whereas a down-sampling ("DS") part thereof is stored at the output line buffer.

According to another embodiment, the sampled information stored at the at least two output line buffers comprises data derived from a plurality of lines, to enable vertical resampling of the data, and possibly to enable vertical multi-resolution processing.

In accordance with another aspect of the disclosure, there is provided a device (e.g. a chip) for use in generating a 3-D image, that comprises:

a receiver configured to receive information that relates to an image of a single target captured by at least two image capturing devices;

at least two input buffers for storing the received information;

at least one processor configured to:

sample the stored information and store the sampled information at at least two output line buffers, each corresponding to a different image resolution;

process the sampled information that had been stored at the at least two output line buffers in accordance with pre-defined disparity related information, wherein the pre-defined disparity related information is associated with a respective one of the at least two image capturing devices that had captured the information being currently processed; and retrieve information from the at least two output line buffers and store the retrieved information at a hybrid row buffer, for generating the image;

at least two output line buffers for storing the sampled information thereat; and at least one hybrid row buffer configured for storing information retrieved from the at least two output line buffers.

According to another embodiment of this aspect, the at least one processor is further configured to filter the information retrieved, to sample the filtered information and store the sampled information at the at least two output line buffers.

By yet another embodiment, the processor is configured to process the information retrieved from the at least two output line buffers by:

a. processing the information retrieved in order to obtain data that relates to disparity and depth from images captured by the at least two image capturing devices;

b. storing data associated with a single resolution level at a separate register of the hybrid row buffer;

c. detecting current resolution in a hybrid line pixel based on pixel location index in the hybrid line;

d. generating a predefined value on stitches that exist between various resolutions in the hybrid line; and e. generating results on a per-pixel basis to obtain a sub-pixel accuracy.

According to still another embodiment, the at least one processor is further configured to merge data obtained, in order to generate an image, by:

a) processing data derived from the captured image processed at a plurality of different resolution levels;

b) merging the processed data derived from the captured image at the plurality of resolution levels;

c) associating each pixel belonging to the image being generated, with a single output value that corresponds to the original resolution level.

In accordance with another embodiment, the hybrid row buffer is configured to store data associated with at least one up sampled region and data associated with at least one down sampled region.

According to yet another embodiment of this aspect of the disclosure, the data associated with at least one down sampled region has equal or larger dynamic range and spatial coverage than data associated with at least one up sampled region.

By still another embodiment, at least one of the at least two output line buffers is adapted to store one or more parts of a line of the image.

According to another embodiment, the at least two output line buffers are configured to store sampled information derived from a plurality of lines, to enable vertical resampling of the data.

BRIEF DESCRIPTION OF THE DRAWING

For a more complete understanding of the present invention, reference is now made to the following detailed description taken in conjunction with the accompanying drawings wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Figure 1:
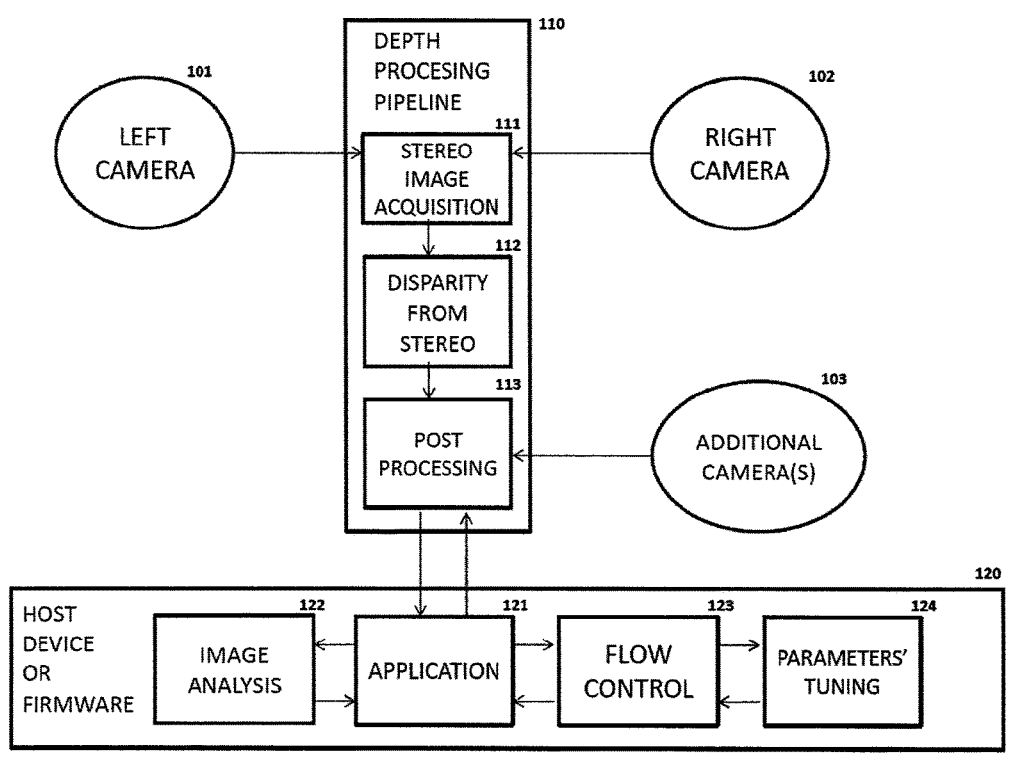
FIG. 1 exemplifies a system construed in accordance with an embodiment of the present disclosure.

FIG. 1 exemplifies a system construed in accordance with an embodiment of the present disclosure. In this system, depth cameras 101 and 102 are configured to capture the same image with a certain displacement there-between, caused by the baseline existing between the images. An additional cameras 103 such as a webcam may be used to provide an RGB image at a higher resolution. Such an RGB image needs to be registered with the depth image in order to provide a 3D display.

Depth processing pipeline 110 may be implemented on a VLSI/FPGA and may generate disparity and depth data as well as registered RGB data from the cameras' inputs. The pipeline is controlled via registers and shadow registers set by host device (or firmware) 120.

Stereo image acquisition block 111 may be a hardware pipeline performing one or more of the following functionalities: sensor control, sensor synchronization, geometric distortion correction, illumination correction and other processing required for generating a reliable stereo image from data retrieved from cameras 101 and 102.

Disparity from stereo block 112 may be hardware pipeline performing operations required to generate disparity from stereo image as will be further described in connection with FIG. 2.

Post processing block 123 may be implemented as a hardware for improving the disparity image and producing depth output. In some embodiments it may further include RGB camera registrations.

Host device (or firmware) 120 is operative to control the depth processing pipeline 110 and to generate an output as required by the end user.

Application block 121 may execute various algorithms requested by the user, including face detection, skeleton tracking, hands tracking, gaze tracking, 3D object stitching, and the like.

Image analysis block 122 is operative to carry out one or more of the following functionalities: image segmentation, object detection and motion analysis as will be further described in connection with FIG. 10.

Flow control block 123 is configured to carry out control of complex flows, using multiple heterogeneous frame acquisition as will be further described in connection with FIG. 11.

Parameter tuning block 124 may include generation of specific registers and shadow registers values, as well as modifying software and firmware parameters for each consecutive frame.

Figure 2:
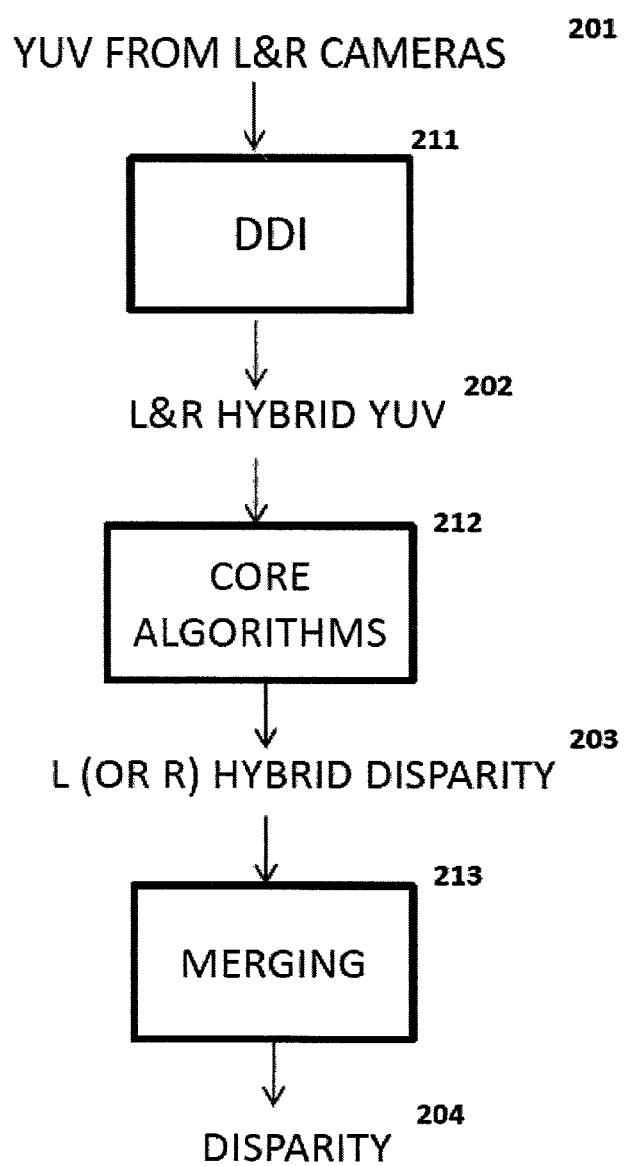
FIG. 2 illustrates a further view of the stereo block of FIG. 1.

FIG. 2 illustrates a further view of stereo block 112 of FIG. 1. In this FIG., left and right YUV image 201 is processed by DDI block 211 (see FIG. 4 for further description of the DDI algorithm).

The term YUV as used herein refers to a color space typically used as part of a color image pipeline. It encodes a color image or video taking human perception into account, allowing reduced bandwidth for chrominance components, thereby typically enabling transmission errors or compression artifacts to be more efficiently masked by the human perception than using a "direct" RGB-representation. As will be appreciated by those skilled in the art, YUV is provided in this example as an illustrative format applicable and other formats such RGB, grayscale or others, may be used. Also, it should be noted that the process may be accelerated by performing length encoding or by sub-sampling of color channels. The number of bits used per pixel may vary from one color channel to another.

The term "DDI" as used herein through the specification and claims is used to denote "Direct Data Interface"

The output of DDI block 211 is a Hybrid YUV image 202 generated separately for the left and for the right channels, comprising Region of Interest ("ROI"), Down-Sampled ("DS") image, and Up-Sampled ("US") boxes, as will be further explained in connection with FIG. 3. It should be noted that DS relates to down-sampling, preferably by a factor that is equal to or greater than 1 (a factor which is not necessarily an integer) and the US relates to up-sampling, preferably by a factor that is equal to or greater than 1 (a factor which is not necessarily an integer). Both the DS and US may be achieved for example by cropping and filtering information retrieved from the captured image.

Core algorithms 212 generate disparity values for each pixel that belongs to the hybrid YUV image. The core algorithm parameters may be set separately for each area in the hybrid image.

The hybrid disparity 203 typically includes disparity levels as observed either on the left or on the right channel, based on the implementation requirements.

Merging block 213 (see also FIG. 8 for further explanation on the algorithm applied) combines disparity information from all areas of hybrid image, thereby enabling generation of the disparity output 204.

Figure 3:
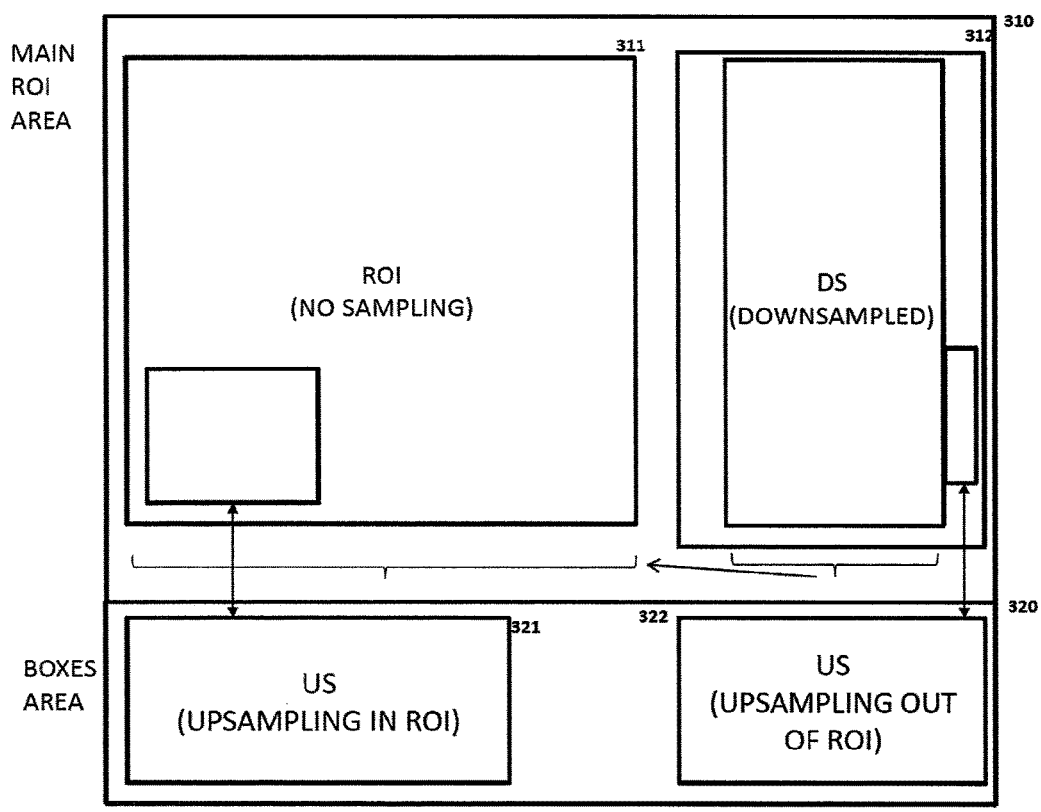
FIG. 3 illustrates a hybrid image structure.

FIG. 3 illustrates the hybrid image structure, wherein the main ROI area 310 comprises ROI and DS. ROI area 311 is typically not resampled, although in some embodiments it may be up-sampled or down-sampled to optimize hardware re-samplers and memory used. In other embodiments the ROI area is cropped from the full image and is contained within the DS support area, to facilitate merging implementations.

The DS area 312 is typically supported by the full image. Due to mathematical properties of down sampling, it represents the image in less pixels while supporting larger range of disparity levels.

The US areas 321 and 322 may appear either at the end of the main ROI, in a way similar to that of the DS area, or instead it may appear in a dedicated area after the main ROI. The actual location of the boxes may be governed by a memory means dedicated to the boxes, line blanking and frame blanking of the sensor and may depend on whether the merging of the US will be performed by using hardware or firmware.

In a typical embodiment, the whole image is down sampled and all available disparity machines are activated in the DS area. Moreover, the DS area will typically be filtered more intensely in order to remove background disparity noise. As a result, the DS typically provides the baseline depth for the image, including the image background, and enables detection of objects of interest.

Normally, only moving objects and objects that require high resolutions will be selected for ROI.

Typically, the ROI is about the size of a quarter of the image and contains the central part of the image both horizontally and vertically. Preferably, only the disparity machines that are relevant to the objects of interest will be activated. The ROI disparity computation is configured to balance between details, noise and energy consumption.

The US boxes may contain small objects where the location of depth edges is critical, including hands, pencils etc. The boxes depth computation is adapted to obtain the best level of edges and details, where the small size of the boxes and the small number of active aggregation machines ensures reasonable energy and power consumption. Typically, the US areas are merged into the main image either in the ROI or in the DS area. For example, if the user's hand is offset from the user's body or if there are several users, US box 322 may appear outside of the ROI.

In some embodiments, there is a padding area located between various areas due to hardware limitations. For some parts of the padding area, the disparity cannot be reliably calculated due to hardware limitations. Such areas may be marked by validity flags.

Figure 4:
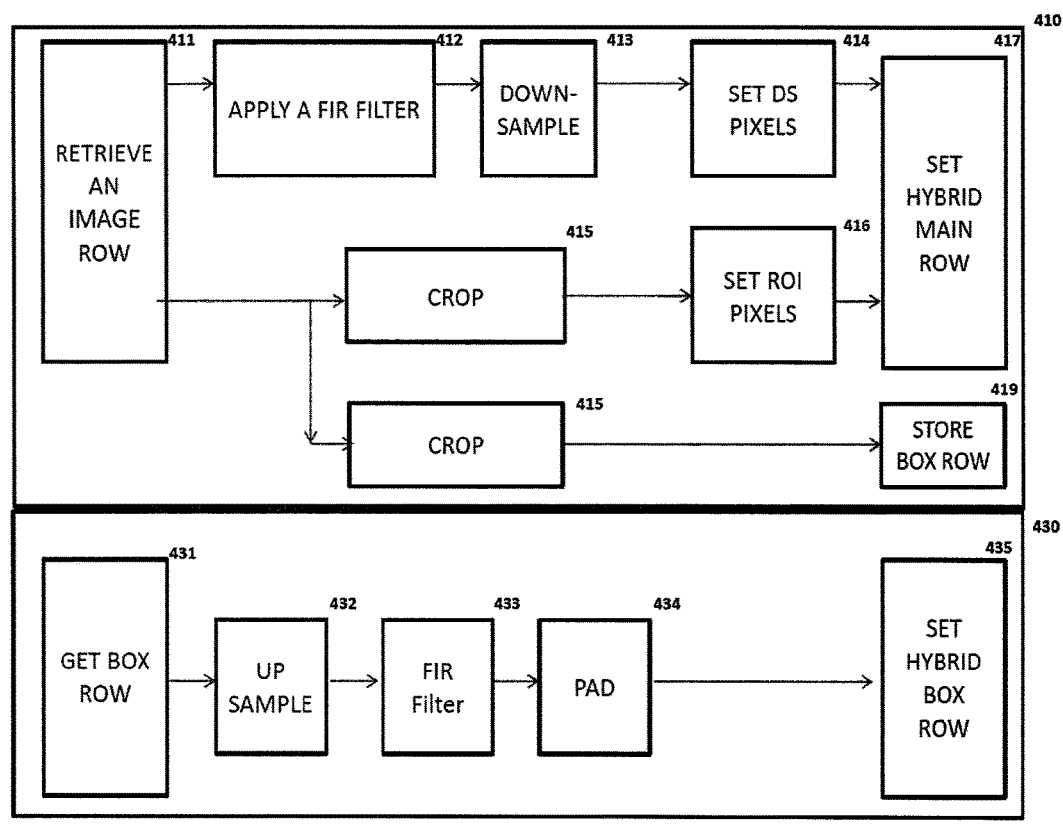
FIG. 4 exemplifies an embodiment by which the Direct Data Interface ("DDI") generates a hybrid image.

FIG. 4 exemplifies an embodiment by which the DDI may generate a hybrid image, wherein in this particular example, the boxes are stored after the main ROI area 310.

Main ROI processing block 410 comprises generating the ROI and DS images and storing the box areas for further processing.

The DDI gets an image row (or a part thereof) with or without flipping from an imaging or memory device.

In order to generate ROI or Box pixels, the image row is typically cropped by cropping block (415) and its output is used to set ROI pixels row buffer or box row buffer. In the particular implementation illustrated in FIG. 4, the box row buffer is a part of a larger box area buffer whereas the ROI line buffer is as large as the input image row buffer. In other implementations, multiple row buffers may be used for the ROI (for example, in order to support vertical resampling) or a single line buffer may be used for US to reduce the silicon area required to implement the block. In some embodiments there is a filter (configurable finite impulse response (FIR), or Infinite impulse response (IIR)) resampling the ROI (for example, the ROI is down sampled (×⅔) and DS down sampled (×3)) to reuse line memory, or in another example, the ROI may be up sampled (×2) and the DS will not be resampled, if the input image is relatively small.

The DS generation may include the use of a configurable FIR filter 412, typically configured to carry out a combination of antialiasing and details' enhancement, down sampling 413, and setting the DS pixel buffer. In some embodiments, the down sampling operation is bypassed, and the merging is performed between blocks of equivalent resolution for better disparity accuracy.

Each row of the hybrid image is set separately in 417, so that the memory buffer required for the multi-resolution is a 1-line large.

In the embodiment shown in FIG. 4, the boxes are processed after processing of the main ROI, during frame blanking of the sensor. The box processing comprises up sampling 432, FIR or IIR filter 433 (smoothing), padding by empty areas to the size required due to hardware limitations (in some embodiments, the same size is used as a main ROI line, while in other embodiments the same width is applied for all boxes) and set in the output row buffer 435.

Figure 5:
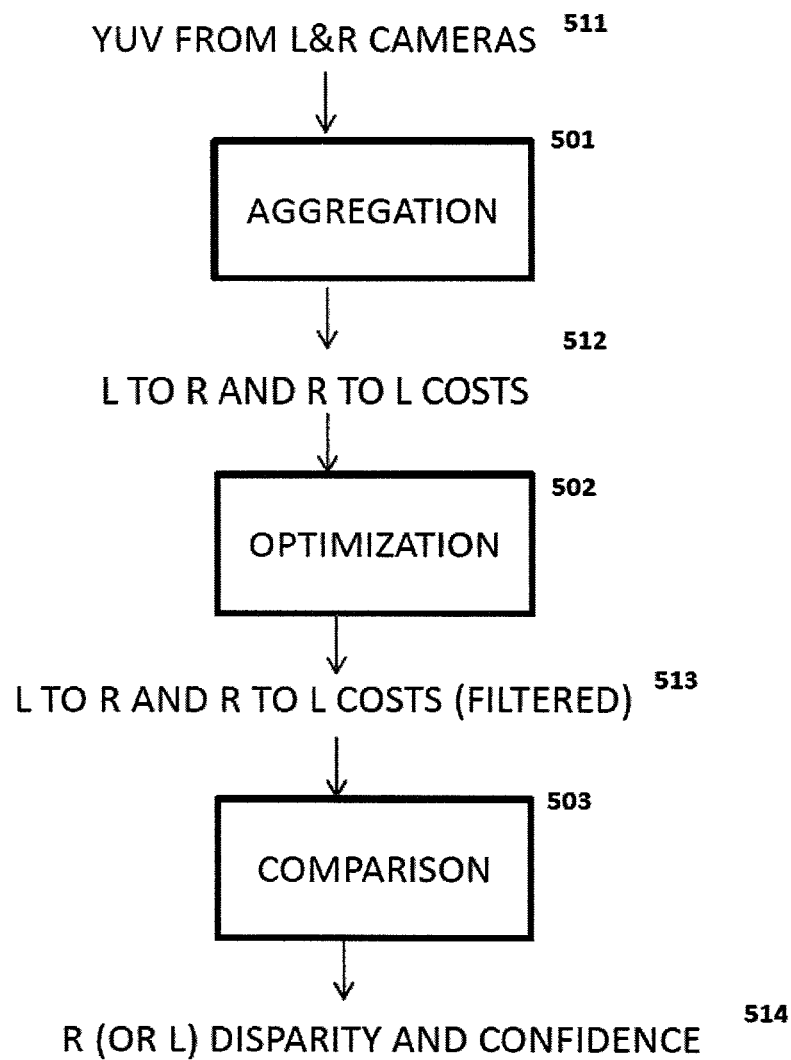
FIG. 5 demonstrates a core depth algorithm.

FIG. 5 demonstrates the use of a core depth algorithm. Both left and right YUF images are received from the stereo pipeline by block 511 on a line by line basis. Small boxes of fixed height, are compared between left and right in order to obtain different disparity levels. This is done typically while using a separate aggregation machine hardware block per a disparity value. The aggregation machines width and the aggregation formula may be configured separately for a given area of the hybrid image.

The hardware used, may count pixels and compute the active setting within each line. For each active setting, the hardware may implement a multiplexer for selecting the correct set of register values.

The aggregation machines in block 501 generate separate costs for displacement from left image to right image and from right image to left image, per a disparity value. The term "cost" as used herein is used to denote a measure of difference between the blocks as seen by the left and right camera. The costs may be selected from any one or more of the following measures: SAD (Sum of Absolute Difference), MSD (Mean Square Difference), Census (information distance), Kullback-Leibler distance, and the like. When the disparity is set accurately, the cost is minimized, i.e. the energy cost required to change left image block into right image block is minimal.

Due to occlusions/parallax effects, the left-to-right and right-to-left costs will be different. The left-to-right and right-to-left costs typically require large hardware memory allocation roughly equivalent to the value of the line width of the area multiplied by the number of disparity machines used. In some embodiments, the memory area may be optimized for longer lines or for a higher number of disparity machines. Typically, the ROI will include longer lines and the DS will feature higher number of disparity machines.

The costs are filtered in optimization block 502 by using a combination of a small edge-sensitive FIR to reduce noise, and a large IIR to fill areas where there is not much information included in the image.

The costs of the left and the right sides are compared with each other in block 503 and the right or left side final disparity is set with its metadata. The disparity and confidence metadata block 514 is further described in FIG. 7.

Figure 6:
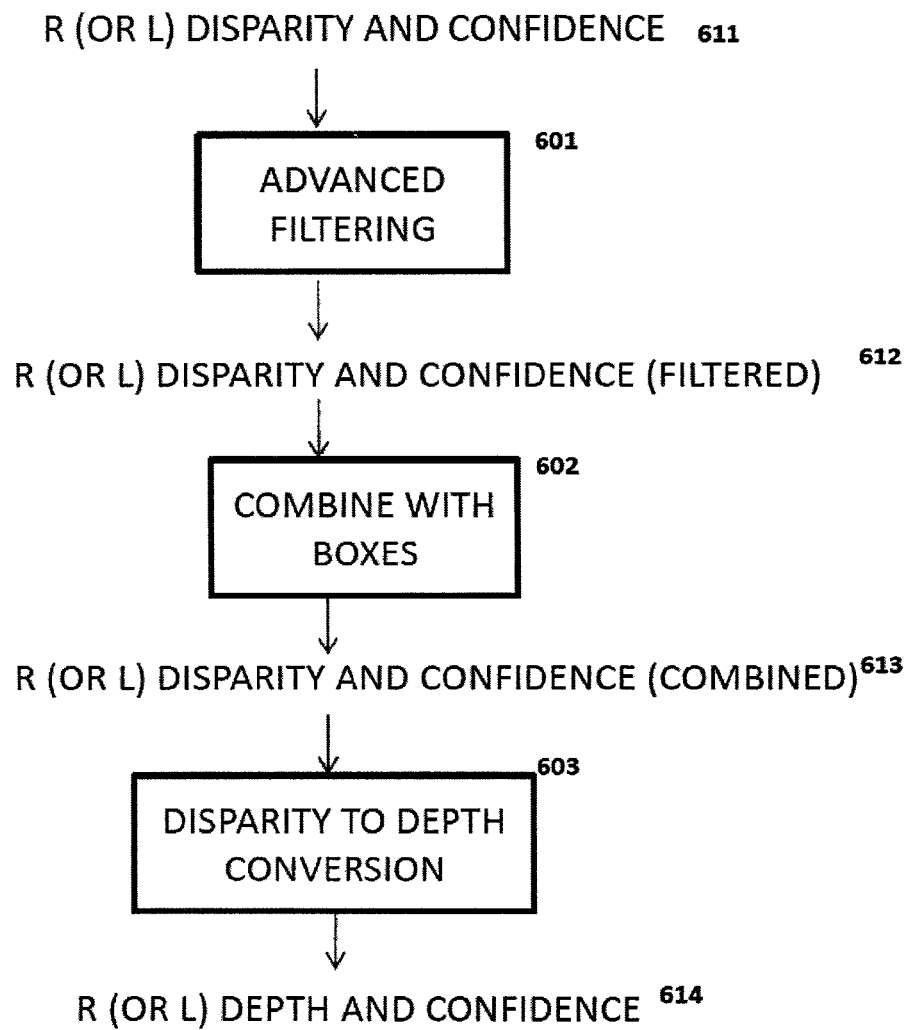
FIG. 6 illustrates a method for carrying out disparity post processing.

FIG. 6 illustrates a method for carrying out disparity post processing. The post processing method (algorithm) may be performed either before or after the merging, or be split between an implementation before the merging and an implementation after the merging.

Optionally, part of the post-processing algorithm may be performed on a chip, while other part of the post processing may be carried out by a firmware and/or by a host processor.

The right or left disparity and confidence metadata (611) undergo advanced filtering (601). Such advanced filtering may comprise a moving recursive least square algorithm, morphological filters to remove outliers and filling holes with invalid disparity values, edge enhancement algorithms, occlusion detection and correction or any other applicable advanced filtering algorithms.

The filtered right or left disparity and confidence metadata 612 is then combined with values from the up sampled boxes. The combination logic may be a complex one to facilitate best adaptation of disparity edges to the YUV edges, and to minimize the noise and occlusion handling.

Since the size of the up sampled blocks is relatively small, it is possible to use relatively complex algorithms for carrying out these functionalities.

The combined right or left disparity and confidence metadata (613) may undergo disparity-to-depth conversion (603). The conversion mechanism relies on metadata such as optics baseline and focus length, field of view and image resolution and some other metadata, in order to generate the respective depth for every disparity value.

The resulting right or left depth and confidence metadata 614 may then be used in an appropriate application, to register additional cameras, to project 3D images, to segment 3D images, to detect 3D objects or for any other applicable targets.

Figure 7:
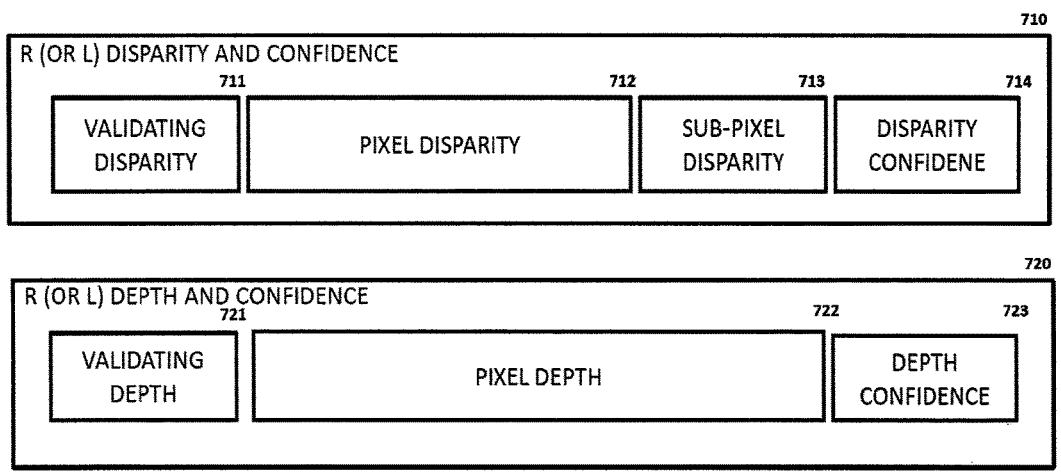
FIG. 7 demonstrates disparity/depth and confidence bit logic.

FIG. 7 demonstrates disparity/depth and confidence bit logic. The disparity and confidence bit logic 710 is quite similar to the depth and confidence bit logic 720.

The validity and data source flags 711 and 721 point at various sources of errors. For example, to partial coverage of ROI within the DS area and DS support within the full image, image margin effects, occlusions, left and right channel variations, etc. Some of the flags may be attributed to scaling, like resampling factor in 711 and depth units in 721, selected pre-sets and other information. In addition, the validity may include indications to the data source, such as ROI vs. DS etc.

The disparity value is derived from the values of the pixels' disparity 712 which are generated by each disparity machine, while sub-pixel disparity values 713 are calculated by executing certain interpolation while using disparity values (for example, parabolic fit and uneven threshold of the fitted result).

The confidence values 714 may be generated for the disparity by using a fuzzy logic based on the quality of the minima after optimization, agreement between left and right in unite, agreement between various resolutions and/or some other criteria. The depth confidence 723 may include a number of bits different from 714, due to communication limitations that may exist within the chip and/or between the chip and the host.

Figure 8:
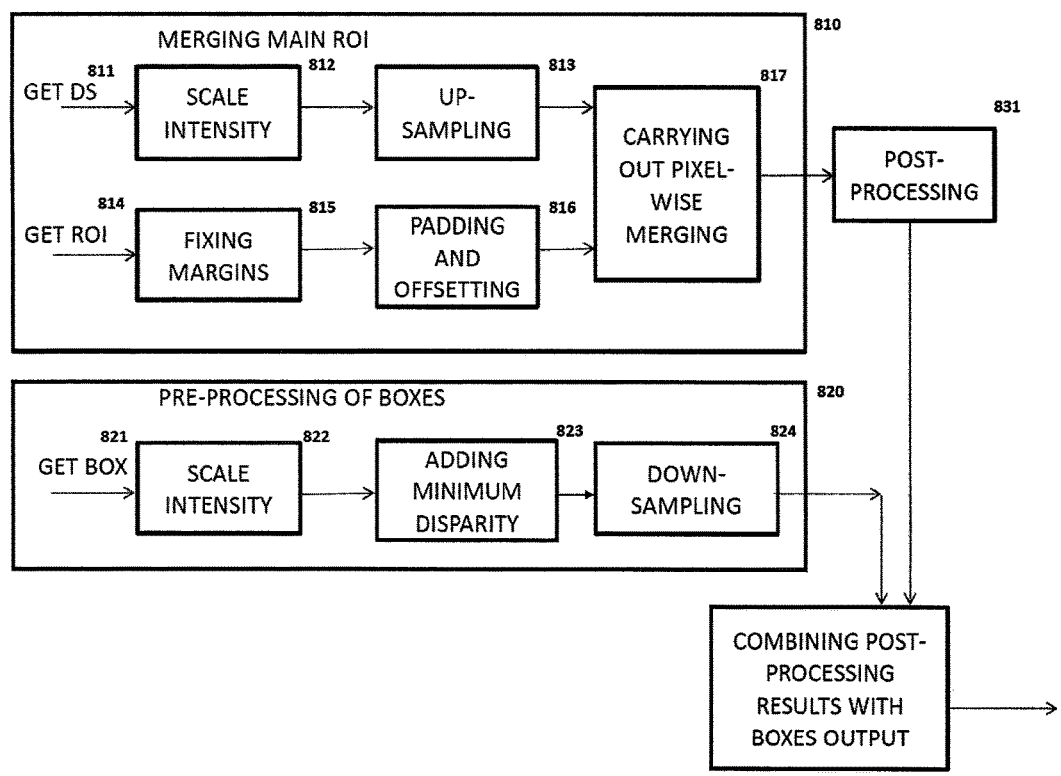
FIG. 8 exemplifies a merging process according to an embodiment of the invention.

FIG. 8 exemplifies a merging process, which is executed by using various resolutions. The main ROI merging 810 begins by getting the line parts that correspond to DS 811 and ROI 814 and storing them at the appropriate line buffers. The DS buffer comprising the sub-pixel values, is scaled up (812) to correct for the disparity properties (each pixel displacement when down-sampled by a factor of X, is equivalent to a displacement by factor of X in the original image). The DS buffer is then up-sampled (813) to the full output size using edge-aware interpolation. If there are multiple line buffers available, bilateral interpolation may be used. The ROI margins are fixed (815) so as to include only machines having reasonable confidence. For example, the right margins of the ROI may be removed by a factor that corresponds to the amount of active disparity machines, since there are no matching pixels within the corresponding stereo field of view. The ROI is further displaced to correspond accurately to its position within the line using buffer padding and disparity offset (816) that correspond to the ROI displacement. The pixel-wise merging logic 817 is further described in FIG. 9.

The up-sampled boxes are pre-processed in a separate pipeline (820). The pre-processing may be performed inline using the main ROI or after completing the full ROI frame. The algorithm gets a box line (821) and downscales its value based on its up-sampling setting. The resulting image has a high sub-pixel resolution. Typically, the up-sampling boxes are centered around some minimal disparity value due to a low number of disparity values covered by active disparity machines. This value needs to be added (823) to the actual disparity values. The resulting disparity is down-sampled while using edge-aware filters, in order to get to the resolution of the original image.

The post-processing step (831) includes one or more of the post-processing functionalities described in connection with 601 above.

Figure 9:
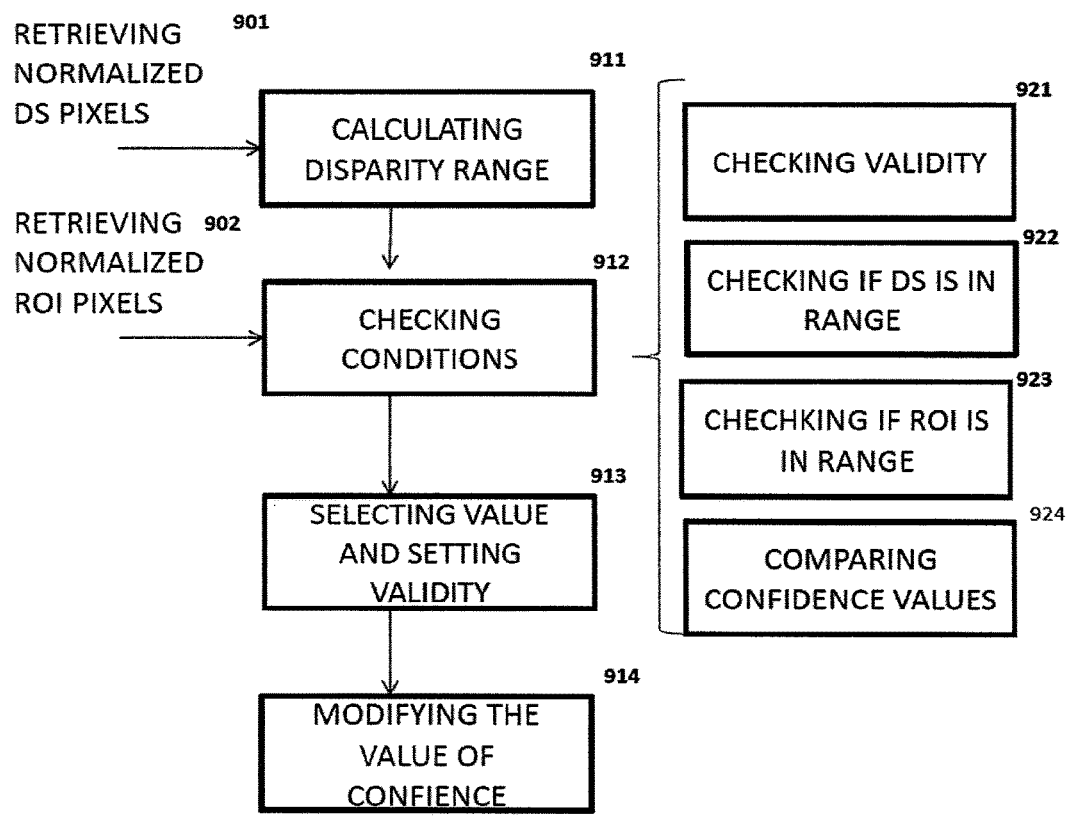
FIG. 9 illustrates a method for merging a logic block at the pixel level.

Turning now to FIG. 9, which illustrates a merging logic block for the pixel level. At the input of this logic block, the line buffers of normalized DS and ROI pixels are aligned with equal resolution and ranges of values.

The hardware used receives the normalized DS values (901) and calculates the disparity range for pixels of interest (911). Such calculation, for example, may be carried out in accordance with the following steps:

a. For pixel X, apply a range R of all disparities comprised in the range X−N . . . X+N where N is approximately half of the aggregation block size, say for example 8. For the range R, calculate the minimal and maximal disparity values $V_{min}$ and $V_{max}$ as well as the sensitivity D being the sensitivity of the disparity algorithm (say, 1+down-sample value). The resulting $L_{min}=V_{min}-D$ and $L_{max}=V_{max}+D$ define the disparity range for the DS pixel.

b. We then obtain the normalized ROI pixel (902) and check a number of conditions (912) as following.

b.(i). Check validity flags of ROI and DS pixel (921). The low validity measure may reflect low confidence, pixels that are not included in the ROI, pixels where the left and right channels are very different from each other, pixels near the image margin and some further measures.

b.(ii) Check if DS disparity is within the ROI range (922). Typically the range of disparity values covered by the DS is larger than the range of disparity values covered by the ROI. The ROI cannot guess correctly the disparity being outside of its range.

b.(iii) Check if the ROI is within the range (923) of disparities of the DS calculated in step (911). ROI value being outside of this range may indicate either a very small object or an outlier. In some embodiments, the YUV image edges may be used to check which of the two is the actual case.

b.(iv) Compare confidences (924) of the DS and the ROI values. In some embodiments the confidences may be stretched prior to carrying out the comparison to allow placing greater weight on the DS value or the ROI value.

b.(v) The results of the conditions found in step (912) may be inputted to a logical table configured to select a value per pixel (913) of the DS or ROI, based on the conditions in (912) and to set the appropriate validity flag(s). The resulting confidence selected is modified (914), to reflect the conditions found in (912), giving higher confidence value to the pixels where the DS and ROI values are similar.

Figure 10:
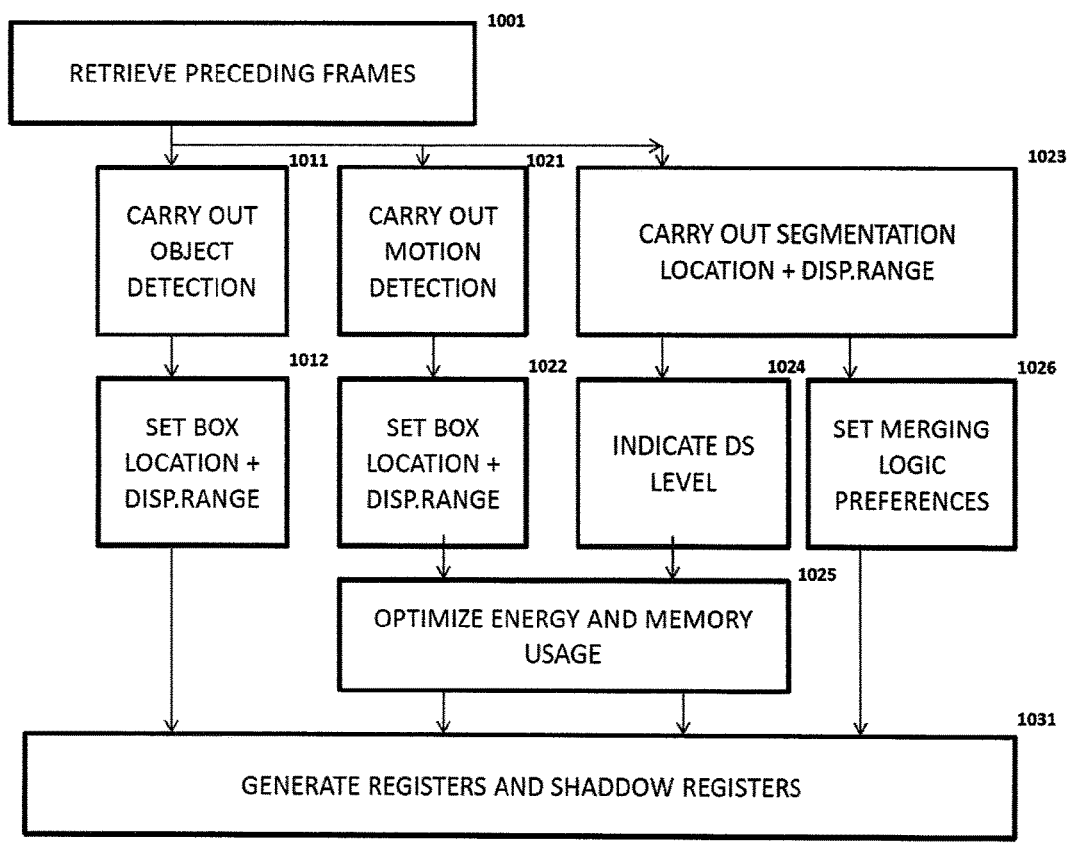
FIG. 10 demonstrates a possible implementation of setting parameters for each frame.

FIG. 10 demonstrates a possible implementation of setting parameters for each frame. The firmware or host processor performs analysis of a preceding frame while a new frame is being captured. The previous frame is retrieved (1001) and processed as follows:

(i) Executing an object detection procedure (1011), that includes face and hands detection or tracking (by using a detection or tracking algorithms, for example Viola Jones detection and Mean Shift tracking algorithms). For each object, a bounding box and a disparity range are set, representing the object (1012), for example as coordinates and active disparity machines for up-sampling boxes 320.

(ii) Executing a motion detection procedure (1021). For example by comparing the last captured frame to a frame that had been previously stored (i.e. a frame that was captured at a time that precedes substantially the current time). The ROI of the motion area (1022) is detected and fed to the ROI (311), as a bounding box and active disparity machines. Due to the motion and margin effects, the effective ROI of (311) may be larger than the area where motion has been detected.

The frame may be segmented (1023) and the currently active disparity machines and their location may be used for the DS 312 settings. The outliers may be detected due to their disparity and location within the image. For example, if the camera is positioned on a table, the lower part of the image will contain very high disparity, yet this disparity may be ignored. The areas of the occlusions may also have various disparity indications, and in fact they should be filtered out since their disparity cannot be determined from the stereo image capturing sensors.

The maximal disparity level may indicate the DS level (1024), in such a way that:

(DS level)*(maximum hardware machines)>(maximum relevant disparity levels)

In some embodiments, the "per pixel" merging logic preferences (1026) may also be set differently for various segments of the image.

The system is configured (1025) to optimize energy usage on the basis of its memory size that is implemented by the hardware. In some embodiments, the preferred ROI and DS and the number of preferred active disparity machines may be larger than the available resources, requiring larger DS level and ROI cropping than the preferred setting.

The results of the frame analysis are converted into commands for generating and setting hardware registers and shadow registers (1031).

Figure 11:
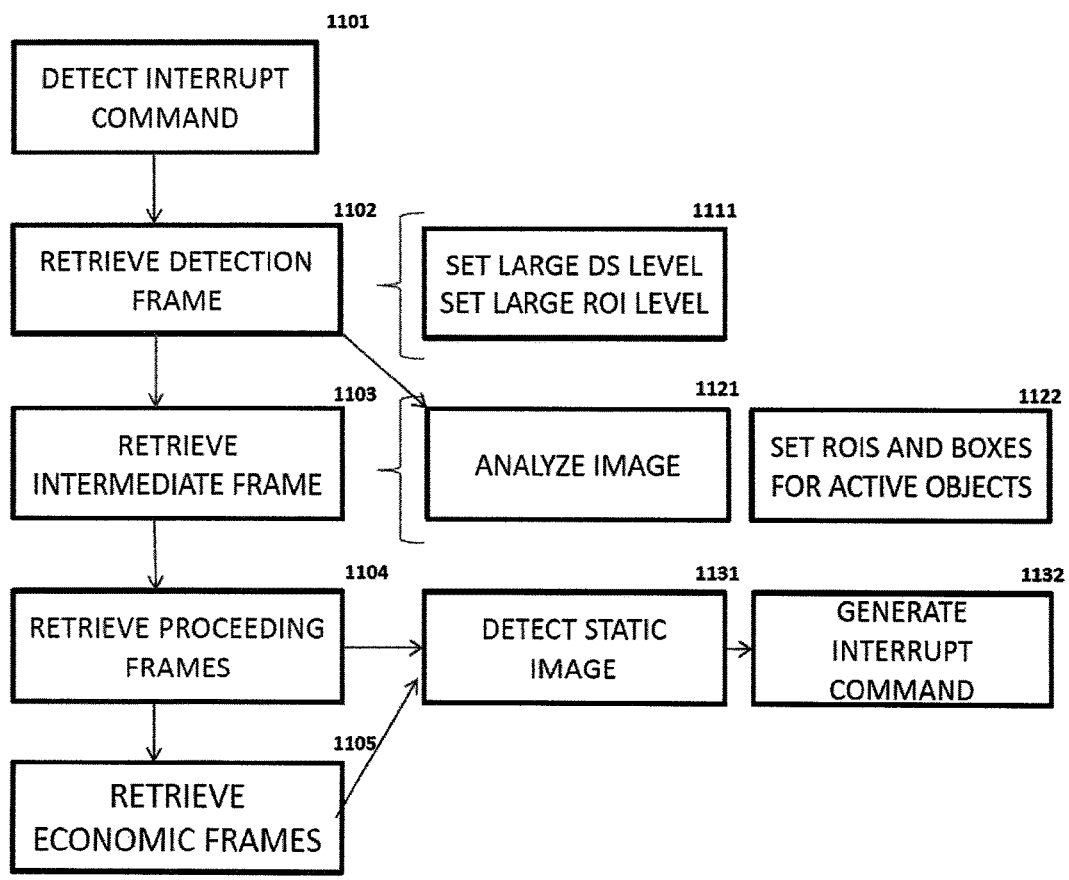
FIG. 11 demonstrates a possible flow for optimizing system energy usage.

FIG. 11 demonstrates a possible flow for optimizing system energy usage. When the system is ready to capture a sequence of frames, an interrupt command is issued. The interrupt command is then detected (1101) and a detection frame is acquired (1102). The detection frame settings comprise setting a large DS level and ROI size for the best range and quality of segmentation (1023). The detection frame image is analyzed (1121) and the ROI and boxes are set (1122) to reflect the results of that analysis. The system may further acquire proceeding frames (1104) that are focused on moving objects. If a static image is detected (1131), the system may acquire economic frames (1105), frames having a high down-sampling level and no active ROI machines. Once the image changes significantly, or upon expiration of a timeout, or upon receiving an input, an interrupt command is generated (1132) and the system is reset and reverts to its state at (1101)

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. For example, the apparatus may include a cameras' array that has two or more cameras, such as, for example, video cameras to capture two or more video streams of the target. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for generating an image, comprising the steps of:
   (i) providing information that relates to an image of a single target that was captured by at least two image capturing devices;
   (ii) storing information provided in at least two input buffers;
   (iii) sampling the stored information to obtain sampled information at at least two different image resolutions, and storing the sampled information at at least two output line buffers, each configured to store sampled information at a different image resolution;
   (iv) processing the sampled information that had been stored at each of the at least two output line buffers in accordance with pre-defined disparity related information, wherein the pre-defined disparity related information is associated with a respective one of the at least two image capturing devices that had captured the information being currently processed;
   (v) retrieving information from the at least two output line buffers and storing the retrieved information at a hybrid row buffer, for generating said image; and
   (vi) repeating steps (i) to (v) in the process of generating said image.

2. The method of claim 1, wherein step (iii) comprises filtering the information retrieved, sampling the filtered information and storing the sampled information at the at least two output line buffers.

3. The method of claim 1, wherein the retrieved information from the at least two output line buffers is processed in accordance with the following steps:
   a. processing the information retrieved to obtain data that relates to disparity and depth from images captured by the at least two image capturing devices;
   b. storing data associated with a single resolution level at a separate register of the hybrid row buffer;
   c. detecting current resolution in a hybrid line pixel based on pixel location index in the hybrid line;
   d. generating a predefined value for stitches that exist between various resolutions in the hybrid line; and
   e. generating results on a per-pixel basis to obtain a sub-pixel accuracy.

4. The method of claim 1, further comprising a step of merging data obtained, which includes:
   a) processing data derived from the captured image processed at a plurality of different resolution levels;
   b) merging the processed data derived from the captured image at the plurality of resolution levels;
   c) associating each pixel belonging to the image being generated, with a single output value that corresponds to the original resolution level.

5. The method of claim 4, wherein step c) further comprises: for each pixel, determining a confidence level that corresponds to the original resolution level.

6. The method of claim 1, wherein the hybrid row buffer comprises data associated with at least one up sampled region and data associated with at least one down sampled region.

7. The method of claim 6, wherein the data associated with at least one down sampled region has equal or larger dynamic range and spatial coverage than data that is associated with at least one up sampled region.

8. The method of claim 6, wherein the data associated with at least one down sampled region is adapted for a better noise resilience, while data that is associated with at least one up sampled region is adapted for a better sub-pixel accuracy and spatial resolution.

9. The method of claim 1, wherein at least one of the at least two output line buffers is adapted to store one or more parts of a line of the image.

10. The method of claim 2, wherein the sampled information stored at the at least two output line buffers comprises data derived from a plurality of lines, to enable vertical resampling of said data.

11. A device for use in generating an image, that comprises:
    a receiver configured to receive information that relates to an image of a single target captured by at least two image capturing devices;
    at least two input buffers for storing the received information;
    at least one processor configured to:
        sample the stored information to obtain sampled information at at least two different image resolutions, and store the sampled information at at least two output line buffers, each configured to store sampled information at a different image resolution;
        process the sampled information that had been stored at the at least two output line buffers in accordance with pre-defined disparity related information, wherein the pre-defined disparity related information is associated with a respective one of the at least two image capturing devices that had captured the information being currently processed; and
        retrieve information from the at least two output line buffers and to store the retrieved information at a hybrid row buffer, for generating the image;
    at least two output line buffers for storing the sampled information thereat; and
    at least one hybrid row buffer configured for storing information retrieved from the at least two output line buffers.

12. The device of claim 11, wherein the at least one processor is further configured to filter the information retrieved, to sample the filtered information and store the sampled information at the at least two output line buffers.

13. The device of claim 11, wherein the processor is configured to process the information retrieved from the at least two output line buffers by:
    a. processing the information retrieved in order to obtain data that relates to disparity and depth from images captured by the at least two image capturing devices;
    b. storing data associated with a single resolution level at a separate register of the hybrid row buffer;
    c. detecting current resolution in a hybrid line pixel based on pixel location index in the hybrid line;
    d. generating a predefined value on stitches between various resolutions in the hybrid line; and
    e. generating results on a per-pixel basis to obtain a sub-pixel accuracy.

14. The device of claim 11, wherein the at least one processor is further configured to merge obtained data in order to generate an image, by:
    a) processing data derived from the captured image processed at a plurality of different resolution levels;
    b) merging the processed data derived from the captured image at the plurality of resolution levels;
    c) associating each pixel belonging to the image being generated, with a single output value that corresponds to the original resolution level.

15. The device of claim 11, wherein the hybrid row buffer is configured to store data that is associated with at least one up sampled region and data associated with at least one down sampled region.

16. The device of claim 15, wherein the data associated with at least one down sampled region has equal or larger dynamic range and spatial coverage than data associated with at least one up sampled region.

17. The device of claim 11, wherein at least one of the at least two output line buffers is adapted to store one or more parts of a line of the image.

18. The device of claim 12, wherein the at least two output line buffers are configured to store sampled information derived from a plurality of lines, to enable vertical resampling of said data.

* * * * *